W. R. Manley.
Paddle Wheel.
No. 1,944 Reissued. May 2, 1865.
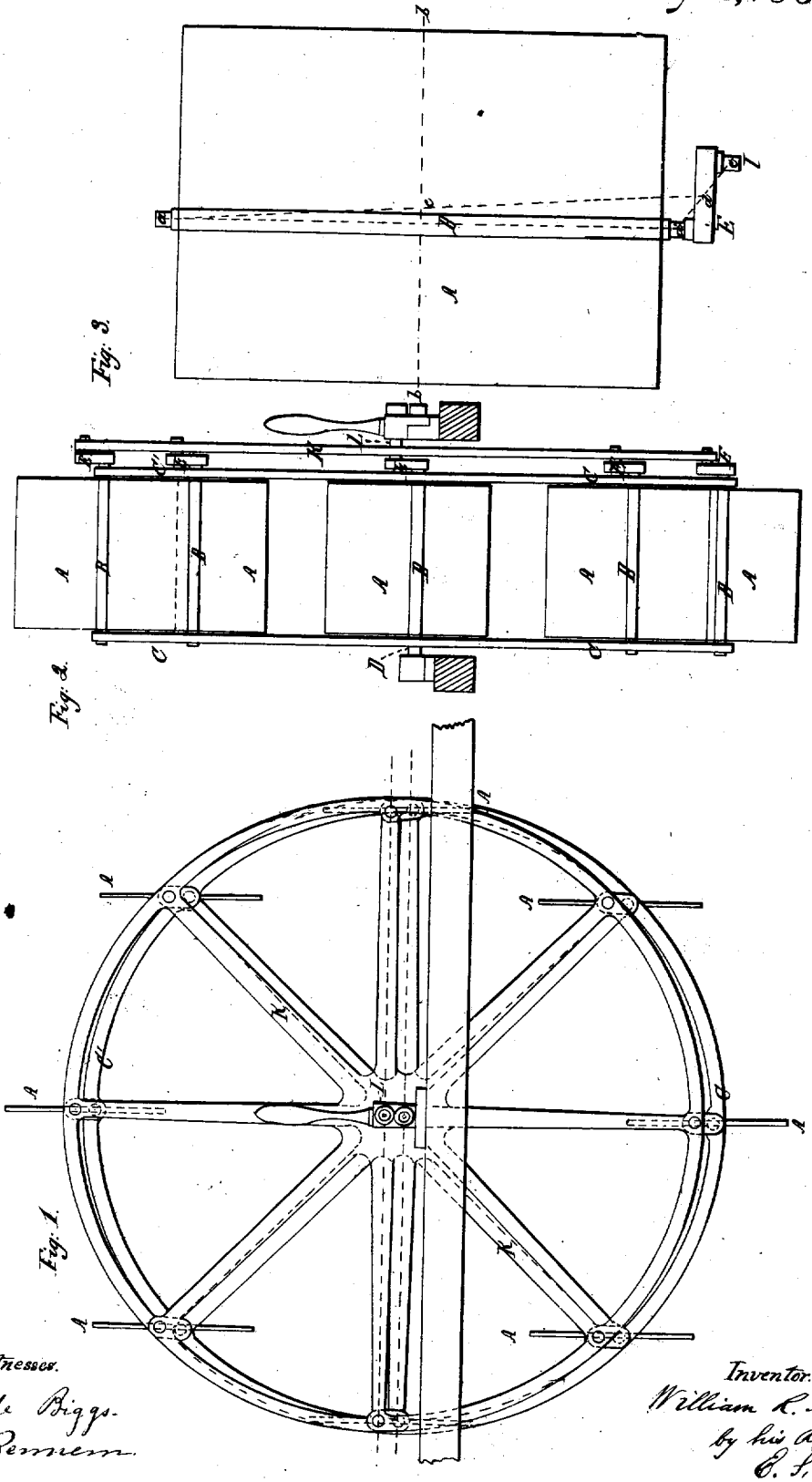
Witnesses.
Melville Biggs.
H. L. Remsen
Inventor.
William R. Manley
by his Attorney
C. S. Renwick.
N. PETERS, PHOTO-LITHOGRAPHER, WASHINGTON, D. C.

UNITED STATES PATENT OFFICE.

WILLIAM R. MANLEY, OF NEW YORK, N. Y., ASSIGNOR TO MANLEY PADDLE WHEEL COMPANY, OF SAME PLACE.

IMPROVED FEATHERING PADDLE-WHEEL.

Specification forming part of Letters Patent No. 35,697, dated June 24, 1862; Reissue No. 1,944, dated May 2, 1865.

*To all whom it may concern:*

Be it known that I, WILLIAM R. MANLEY, of the city, county, and State of New York, have invented a new and useful improvement in feathering paddle-wheels for the propulsion of boats and vessels, and for other purposes to which it may be applied; and I declare that the following is a full, clear, and exact description of my said invention, reference being had to the accompanying drawings, in which—

Figure 1 represents a side elevation of a wheel embodying my invention. Fig. 2 represents a face view of the same; and Fig. 3 represents a face view of one of the buckets and its rock-shaft detached from the wheel, and drawn upon a larger scale than the other figures.

The object of the invention is to distribute the pressure of the paddles upon the frame-work of the wheel which sustains them. Feathering-paddles have usually been constructed with a series or paddles, (or "buckets," as they are sometimes called,) mounted upon rock-shafts carried by a pair of side frames composed of rims and arms, and with each paddle controlled by a crank-arm fitted with a crank-pin that is connected with a frame of rods, which revolves upon a center that is eccentric to the shaft of the paddle-wheel, the series of controlling-cranks, frame of rods, and eccentric center constituting the feathering mechanism of the wheel. In such wheels it has been customary to arrange each paddle with its center in the axial line of the rock-shaft to which it is secured, or thereabout, the effect of which is that the pressure of the paddle against its supports at the side of the wheel adjacent to the feathering mechanism is sustained wholly (or substantially so) by the adjacent side frame of the paddle-wheel, while the feathering mechanism is subjected only (or substantially so) to the strain which tends to rock the paddles on the axis of their rock-shafts.

The present invention consists in the combination and arrangement of the paddle of a feathering paddle-wheel, with its rock-shaft and with the frame-work of the paddle-wheel, (including the feathering mechanism) in such manner that the center of the paddle is situated at one side of the axial line of its rock-shaft in such position relatively to the journals of the paddle rock-shaft and crank-pin of the controlling-arm that the pressure of the paddle at the side of the wheel adjacent to the feathering mechanism is divided equally, or substantially so, between the adjacent side frame of the paddle-wheel and the frame of the feathering mechanism.

The accompanying drawings represent the invention as embodied in a paddle-wheel constructed in other respects substantially like that patented in England in the year 1813 by Robert Buchanan. In this example there are eight feathering paddles, A A, each of which is secured to a rock-shaft, B, whose journals are received in boxes secured to the side-frames, C C′, of the paddle-wheel. The side-frames, C C′, are constructed of arms and rims secured to hubs, which are mounted upon and keyed fast to the paddle-shaft D. Each paddle is controlled by means of a crank-arm, E, which is fastened to its rock-shaft. Each crank-arm E is fitted with a crank-pin, I, and the crank-pins of all the crank-arms are connected with the frame K of the feathering mechanism. This frame K is composed of arms, rim, and a hub similar to the side frames of the paddle-wheel, and it is arranged to revolve at its center upon the fixed center L, which is eccentric to the shaft D of the paddle-wheel, and is maintained in this eccentric position by the frame-work of the paddle-box of the vessel to which the paddle-wheel is applied.

In order that the present invention may be fully embodied in the wheel represented, the position of the center of the paddle is determined in the following manner: A line, *a a′*, is drawn at the position of the axis of the paddle rock-shaft from the center of one journal of the rock-shaft to the center of the other journal thereof, and the line *b b* is drawn perpendicular to the line *a a′* at the middle of its length. A line, *c a′*, is drawn in the plane of the paddle from the center of the journal of the crank-pin I to the center of the journal of the paddle rock-shaft adjacent the feathering mechanism. This line is divided into two equal parts at *d*, and a line, *a d*, is drawn from the center of the journal of the paddle rock-shaft farthest from the feathering mechanism to the said point *d*, thereby intersecting the line *b b* at *e*. The center of the paddle is placed at the point *e*. As the radius of the crank-arm E is in this instance in the plane of the paddle, the line *a′ c* is drawn to the periphery of the circle of which the radius of the center of the crank-pin is the radius, as well as to the center of the crank-pin; but if the crank-arm had been inclined to the plane of the paddle, so that the center of the crank-pin had not been in the plane of the paddle, the line *a′ c* would have been drawn in the plane of the paddle to the periphery of the circle drawn through the center of the crank-pin in a plane perpendicular to the plane of the paddle, with the axis of the rock-shaft as a center.

From this combination and arrangement of the paddle with the rock-shaft and the frame-work of the wheel, it results that the pressure of the paddle upon its sustaining mechanism at the side of the wheel adjacent to the feathering mechanism is divided equally between the adjacent side frame C′ of the wheel and the frame K of the feathering mechanism, and that the side frame C′ of the paddle-wheel is relieved of so much of the pressure of the paddle as is sustained by the frame of the feathering mechanism.

The invention has been described as applied to a paddle-wheel of the Buchanan variety, as an illustration of one mode in which it can be carried into effect; but the invention is applicable to other forms of feathering paddle-wheels.

The employment of feathering paddles in a paddle-wheel is not claimed, nor the mere arrangement of the centers of the paddles somewhat out of the axial lines of their rock-shafts; but

What I claim as my invention, and desire to secure by Letters Patent, is—

The combination and arrangement of the paddle of a feathering paddle-wheel with its rock-shaft and the frame-work of the paddle-wheel in such manner that the center of the the paddle is situated in such position that the pressure at the end of the paddle adjacent to the feathering mechanism is divided equally (or substantially so) between the adjacent side frame of the paddle-wheel and the frame of the feathering mechanism, substantially as set forth.

In witness whereof I have hereunto set my hand.

WILLIAM R. MANLEY.

Witnesses:

WILLIAM F. REDDING,
JAMES B. POST.